(12) United States Patent
Merrifield

(10) Patent No.: US 9,249,565 B2
(45) Date of Patent: Feb. 2, 2016

(54) DEPLOYABLE TRUSS WITH ORTHOGONALLY-HINGED PRIMARY CHORDS

(71) Applicant: CPI Technologies, LLC, Merritt Island, FL (US)

(72) Inventor: Donald V. Merrifield, Smyrna, TN (US)

( * ) Notice: Subject to any disclaimer, the term of this patent is extended or adjusted under 35 U.S.C. 154(b) by 0 days.

(21) Appl. No.: 14/461,485

(22) Filed: Aug. 18, 2014

(65) Prior Publication Data

US 2015/0101261 A1 Apr. 16, 2015

Related U.S. Application Data

(63) Continuation-in-part of application No. 13/708,666, filed on Dec. 7, 2012, now Pat. No. 8,813,455.

(60) Provisional application No. 61/567,697, filed on Dec. 7, 2011.

(51) Int. Cl.
| | |
|---|---|
| *E04B 1/343* | (2006.01) |
| *E04B 1/19* | (2006.01) |
| *E04B 1/344* | (2006.01) |
| *E04C 3/02* | (2006.01) |
| *E04B 1/35* | (2006.01) |
| *E04C 3/00* | (2006.01) |
| *B64G 1/22* | (2006.01) |
| *E01D 15/12* | (2006.01) |

(52) U.S. Cl.
CPC .............. *E04B 1/34357* (2013.01); *B64G 1/22* (2013.01); *B64G 1/222* (2013.01); *E01D 15/124* (2013.01); *E04B 1/19* (2013.01); *E04B 1/344* (2013.01); *E04B 1/35* (2013.01); *E04C 3/005* (2013.01); *E04C 3/02* (2013.01); *E04B 2001/1957* (2013.01); *E04B 2001/1987* (2013.01)

(58) Field of Classification Search
CPC . E04B 1/34357; E04B 1/34384; E04B 1/344; E04B 1/34336; E04B 1/34305; E04B 1/3445; E04B 1/343; E04B 1/3441; E04B 1/19; E04B 1/34331; B64G 1/222; B64G 1/44; B64G 1/66; B64G 1/22; B64G 1/443; E04H 15/48; E04H 1/005; E04H 15/46; E04H 12/182; E04H 12/18; E04H 12/187; B60P 3/34
See application file for complete search history.

(56) References Cited

U.S. PATENT DOCUMENTS

| | | | | |
|---|---|---|---|---|
| 2,511,613 | A | * 6/1950 | Woolslayer et al. | 248/670 |
| 3,435,570 | A | * 4/1969 | Berry | 52/109 |
| 3,783,573 | A | * 1/1974 | Vaughan | 52/646 |

(Continued)

*Primary Examiner* — Joshua J Michener
*Assistant Examiner* — Matthew Gitlin
(74) *Attorney, Agent, or Firm* — W. Edward Ramage; Baker Donelson

(57) ABSTRACT

A deployable truss with modified primary orthogonal joints. The construction of these joints causes the center-hinged primary chords on opposite sides of a truss bay to fold inward in a plane orthogonal to the folding planes of the side diagonals while the two secondary chords fold in planes orthogonal to the plane of the in-folding primary chords. This provides for stiffness and stability during deploy and retract. The unique joint configuration permits the truss to deploy one bay at a time in a stable manner while having lateral bending stiffness, and the truss thus can extend and retract in a sequential manner. It can deploy integral flat panels nested between the secondary folding chords, or use cross bracing in lieu of panels. The truss can be triangular, square or rectangular in cross-section. A powered support frame may be used in conjunction with the truss.

18 Claims, 10 Drawing Sheets

(56) References Cited

U.S. PATENT DOCUMENTS

| | | | | |
|---|---|---|---|---|
| 3,830,031 A | * | 8/1974 | Soisson | 52/645 |
| 4,480,415 A | * | 11/1984 | Truss | 52/108 |
| 4,527,362 A | * | 7/1985 | Tobey et al. | 52/71 |
| 4,539,786 A | * | 9/1985 | Nelson | 52/645 |
| 4,557,083 A | * | 12/1985 | Zanardo | 52/109 |
| 4,557,097 A | * | 12/1985 | Mikulas et al. | 52/646 |
| 4,569,176 A | * | 2/1986 | Hedgepeth et al. | 52/645 |
| 4,575,975 A | * | 3/1986 | Eisenberg | 52/109 |
| 4,587,777 A | * | 5/1986 | Vasques et al. | 52/108 |
| 4,633,566 A | * | 1/1987 | Coppa | 29/429 |
| 4,805,368 A | * | 2/1989 | Wesselski | 52/573.1 |
| 4,819,399 A | * | 4/1989 | Onoda | 52/646 |
| 4,829,726 A | * | 5/1989 | de Potter d'Indoye | 52/66 |
| 4,958,474 A | * | 9/1990 | Adams | 52/646 |
| 5,040,349 A | * | 8/1991 | Onoda et al. | 52/646 |
| 5,085,018 A | * | 2/1992 | Kitamura et al. | 52/108 |
| 5,228,258 A | * | 7/1993 | Onoda et al. | 52/646 |
| 6,076,770 A | * | 6/2000 | Nygren et al. | 244/159.5 |
| 2007/0044415 A1 | * | 3/2007 | Merrifield et al. | 52/633 |
| 2007/0145195 A1 | * | 6/2007 | Thomson et al. | 244/172.6 |
| 2008/0283670 A1 | * | 11/2008 | Harvey et al. | 244/172.6 |

\* cited by examiner

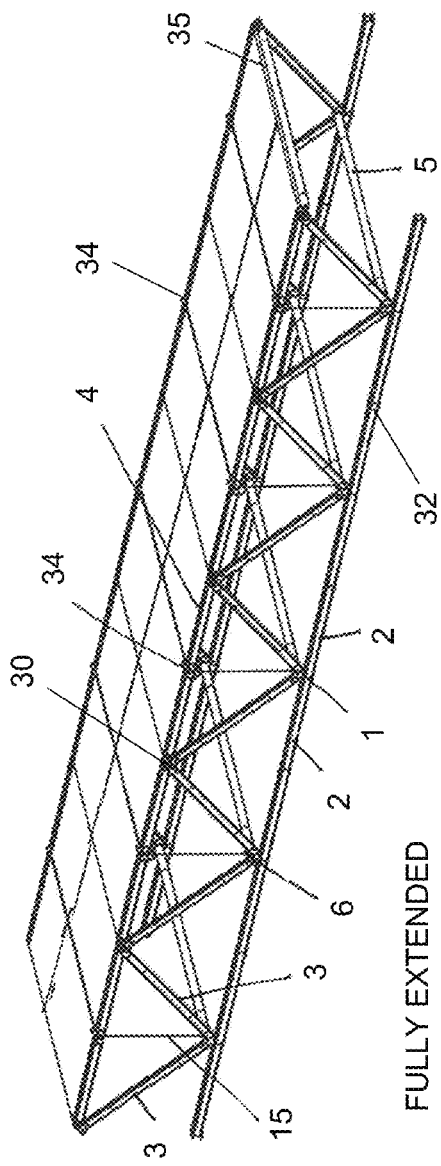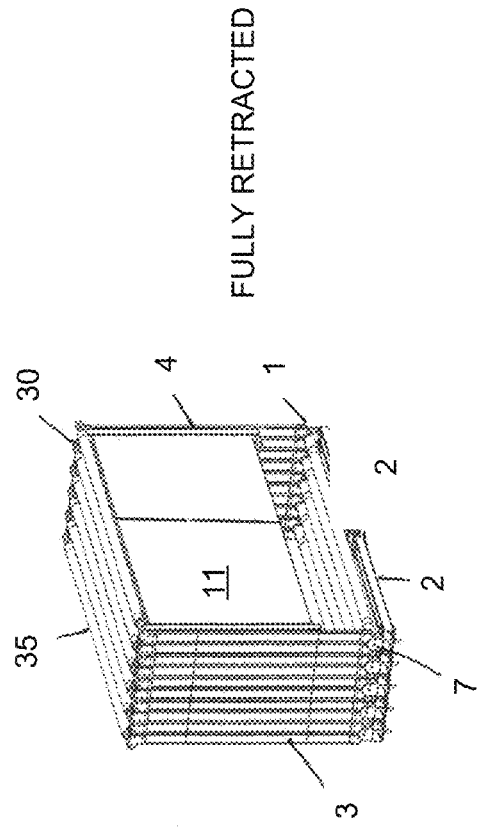
FIGURE 1A
FIGURE 1B

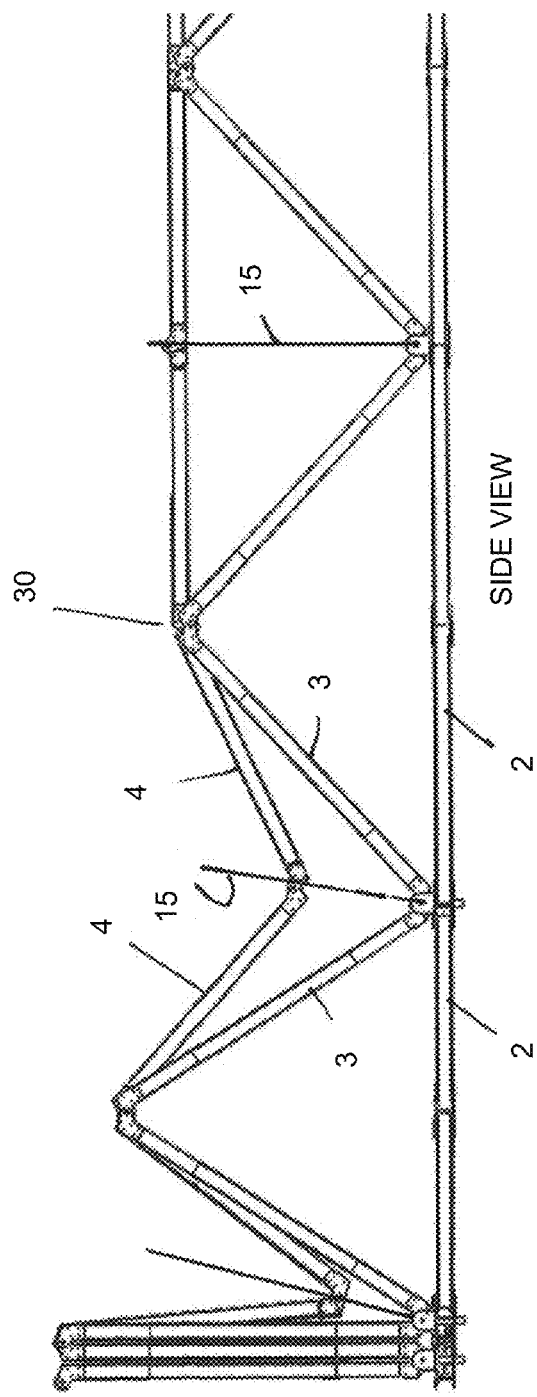
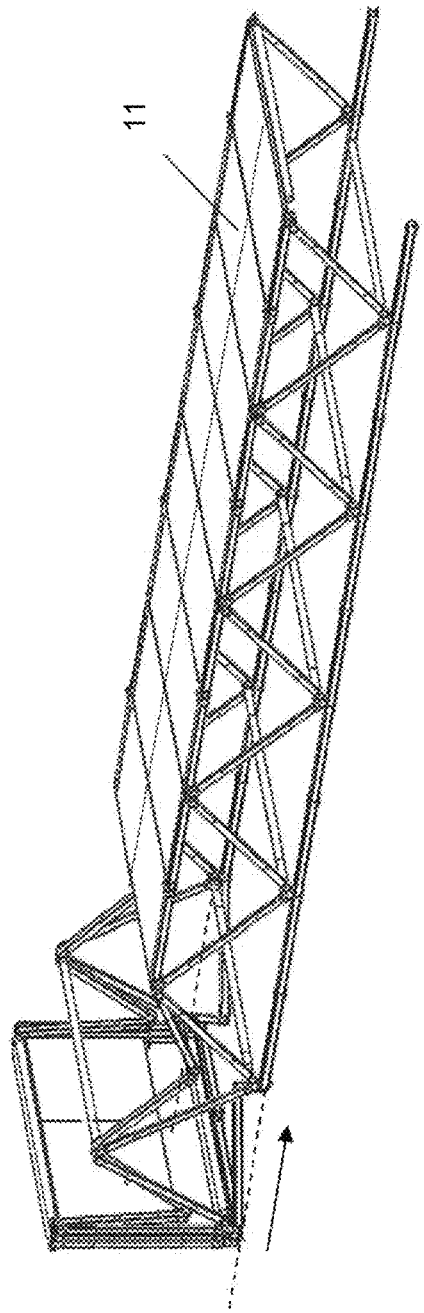

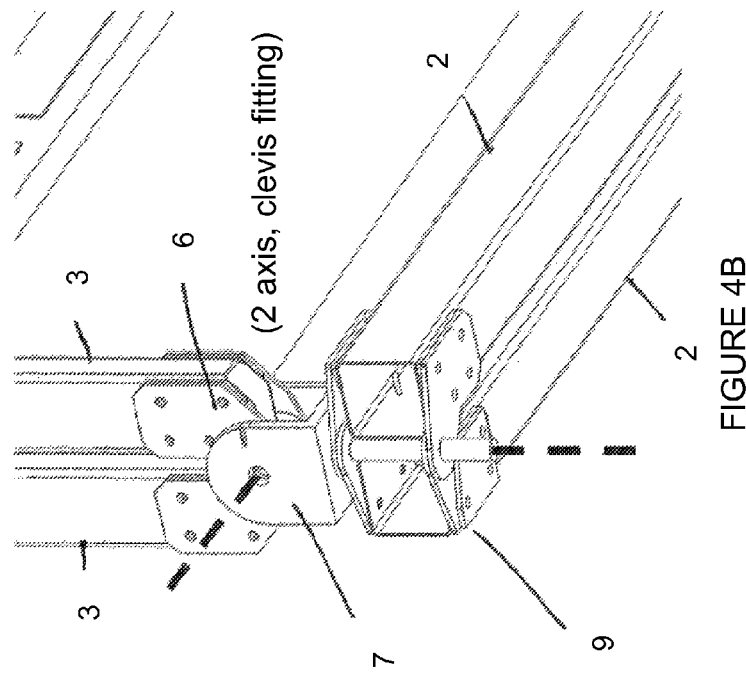
FIGURE 4B (2 axis, clevis fitting)
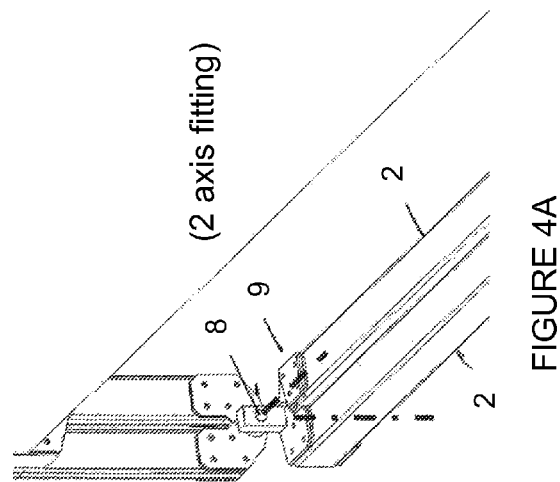
FIGURE 4A (2 axis fitting)
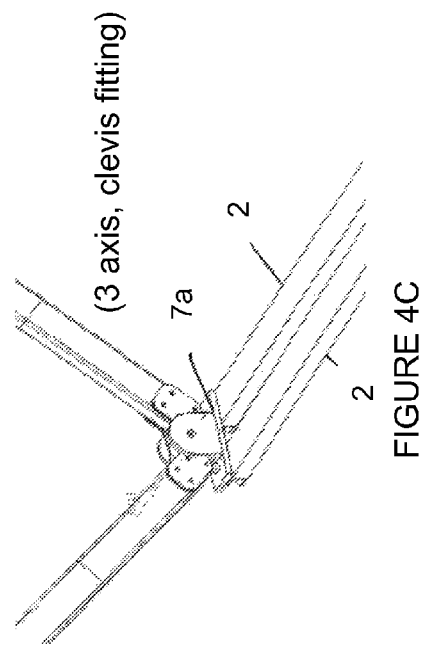
FIGURE 4C (3 axis, clevis fitting)

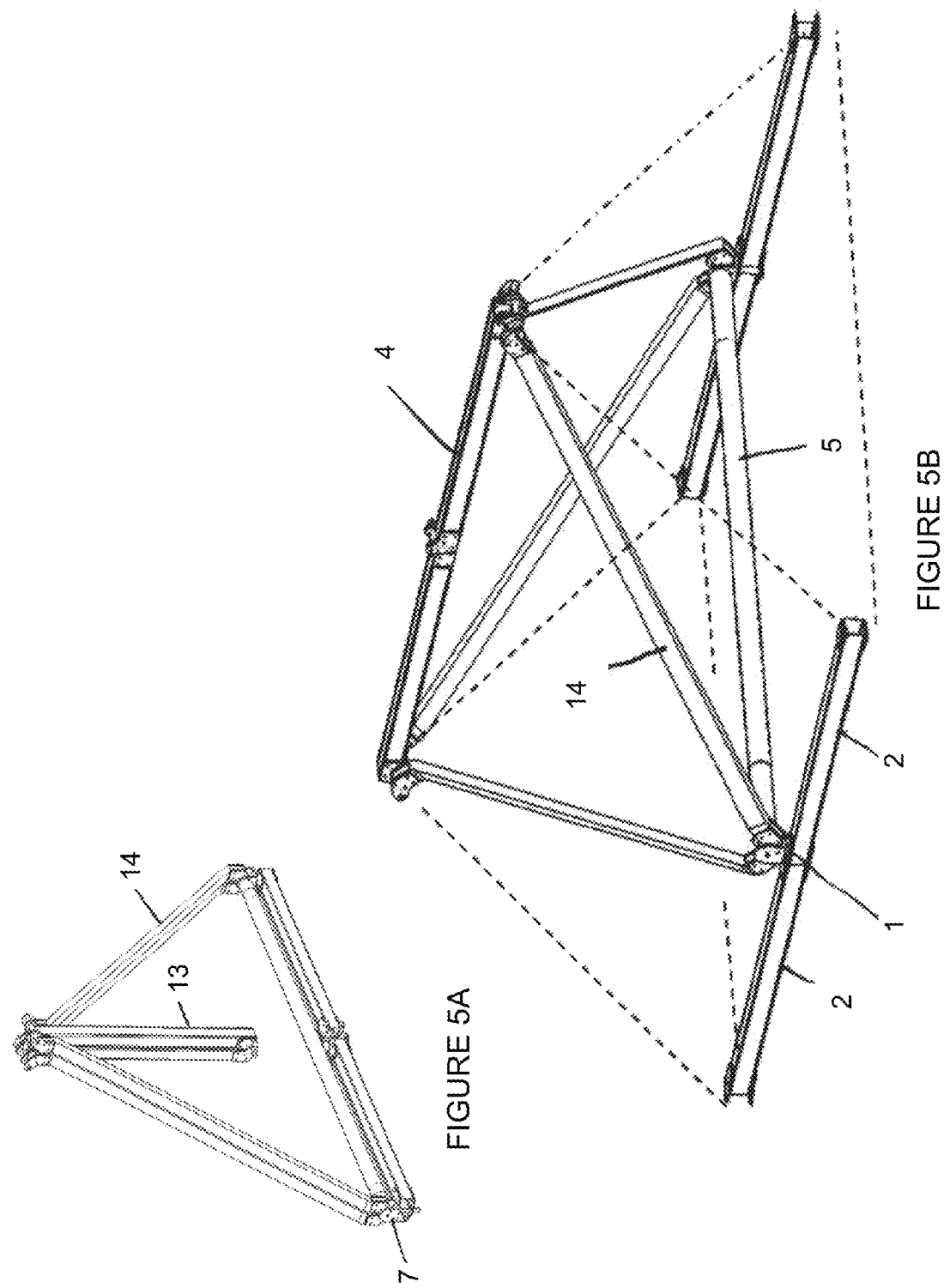

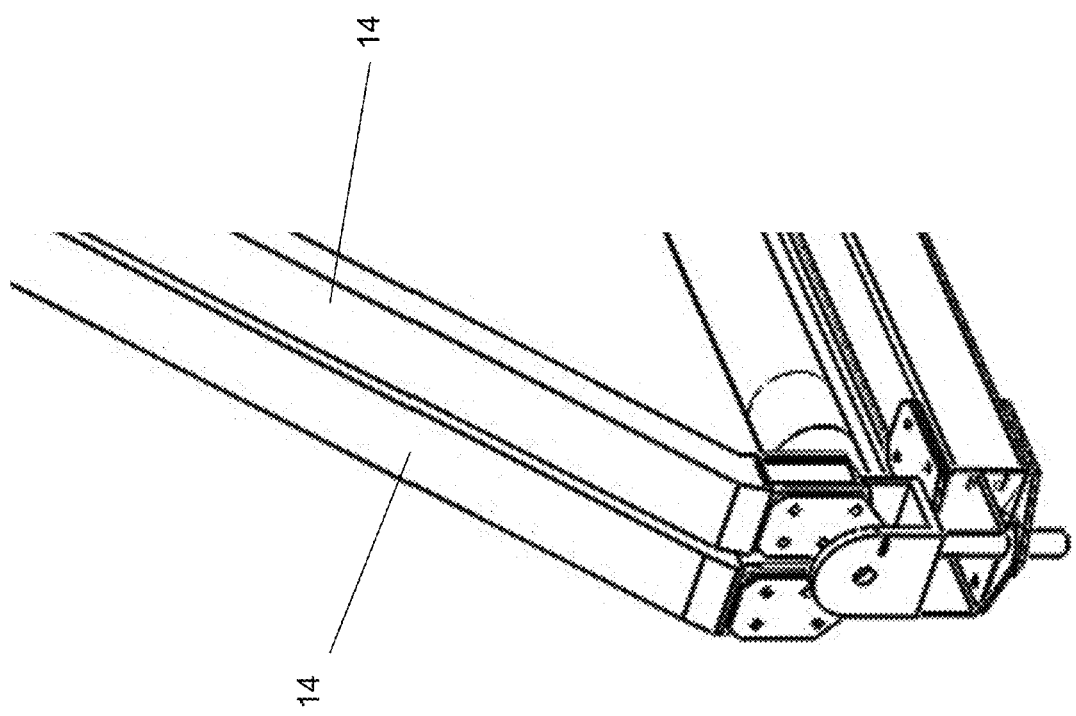

DEPLOYABLE TRUSS WITH ORTHOGONALLY-HINGED PRIMARY CHORDS

This application is a continuation-in-part of U.S. patent application Ser. No. 13/708,666, filed Dec. 7, 2012, which claims benefit of and priority to U.S. Provisional Application No. 61/567,697, filed Dec. 7, 2011, by Donald V. Merrifield, and is entitled to those filing dates for priority in whole or in part. The specifications, figures and complete disclosures of U.S. patent application Ser. No. 13/708,666 and U.S. Provisional Application No. 61/567,697 are incorporated herein by specific reference for all purposes.

FIELD OF INVENTION

This invention relates generally to deployable truss structures, and more particularly to a three-dimensional truss with orthogonally-hinged chords which expands and retracts in a continuous, stable, and sequential fashion, and has low manufacturing cost and favorable design/packaging characteristics.

BACKGROUND OF THE INVENTION

There have been many attempts to design, for various operating environments, a practical compact folding or flexing truss structure which can transition easily between the retracted and the useful extended state while exhibiting favorable characteristics of size/volume ratio, kinematic stability, simplicity and reliability, structural efficiency and weight, complexity, auxiliary mechanism requirements, manufacturing costs, speed of operation, and operating cost. Relatively few designs have appeared in the marketplace. Notable high-profile, and high-flying, examples are deployable trusses used in space missions such as for solar array deployment on NASA's International Space Station. Another example is the deployable truss disclosed in U.S. Pat. No. 7,028,442, which claims priority to U.S. Provisional Patent Application No. 60/302,997 (the complete disclosures, specifications and drawings of U.S. Pat. No. 7,028,442 and Provisional Application No. 60/302,997 are incorporated herein in their entireties by specific reference for all purposes).

Yet a further example is the rectangular deployable/folding truss structure with panels disclosed in U.S. patent application Ser. No. 12/765,532, the complete disclosure, specification and drawings of which are incorporated herein in their entireties by specific reference for all purposes. The present application is an improvement over the latter structure, providing new operational and functional capabilities, design flexibilities, and manufacturing alternatives.

SUMMARY OF THE INVENTION

The present invention comprises a deployable truss with modified primary orthogonal joints. The construction of these joints causes the center-hinged primary chords on opposite sides of a truss bay to fold inward in a plane orthogonal to the folding planes of the side diagonals while the two secondary chords fold in planes orthogonal to the plane of the in-folding primary chords. This provides for stiffness and stability during deploy and retract. The unique joint configuration permits the truss to optionally deploy one bay at a time in a stable manner while having lateral bending stiffness. The truss of the present invention thus can extend and retract in a sequential manner. It can deploy integral flat panels nested between the secondary folding chords, or use cross bracing in lieu of panels. With or without integral panels the folded members and joints form a basic rectangular truss beam structure.

With an alternate embodiment of the truss diagonals, it can also form a triangular beam using the same in-folding center-hinged chords and joints. The triangular truss kinematic behavior is the same as for the rectangular truss. In all cases the trusses are symmetrical about one axis. They can retract in a length typically 4-8% of the extended length until ready for deployment, either with integral panels or simply as a rigid beam. As a panel truss, various types of square or rectangular panels can therefore be folded together compactly for transportation and handling.

There are numerous applications benefitting from sequential bay-wise deploy/retract as compared with synchronous motion exhibited by the prior art. This is accomplished while being kinematically stable about two axes, which is particularly important for zero-gravity, low-gravity and undersea applications, and does not require a complex and costly mechanism to form each bay as in prior deployable truss inventions, most prominently exemplified by solar array trusses used on the International Space Station, previous U.S. Space Shuttle missions, and numerous space satellites. For use as a compact deployer of solar photovoltaic panels, there are important applications in which critical deploy/retract operations of long multi-bay trusses are enabled. Space applications exist for secondary structures which are kinematically extendible from a very compact packaging, for space habitats and other space or surface structures in orbit or on the Moon, Mars and asteroids. The basic configuration of this new invention opens the potential for replacement of its pin/hole revolute joints with flexible materials such as shape-memory or superelastic, for critical applications requiring zero joint free-play and dust-tolerant operation. Among the many envisioned commercial, industrial, and military applications, there are applications to mobile and fixed solar panels, towers, bridging, access platforms, conveyors, rescue platforms, fire ladders, large folding panel displays, and several others.

BRIEF DESCRIPTION OF THE DRAWINGS

FIGS. 1A and 1B show views of a rectangular truss with five bays fully extended and retracted.

FIGS. 2A and 2B show views of a rectangular truss in a partially-deployed state.

FIG. 4A shows an embodiment of the primary orthogonal joint with a 2-axis fitting.

FIG. 4B shows an embodiment of the primary orthogonal joint with a 2-axis clevis fitting.

FIG. 4C shows an embodiment of the primary orthogonal joint with a 3-axis clevis fitting.

FIGS. 5A and 5B show a triangular truss in accordance with an alternative embodiment of the present invention.

FIG. 5C shows angled offset fittings at the end of the diagonal members of the triangular truss.

DETAILED DESCRIPTION OF EXEMPLARY EMBODIMENTS

Figure 3B:
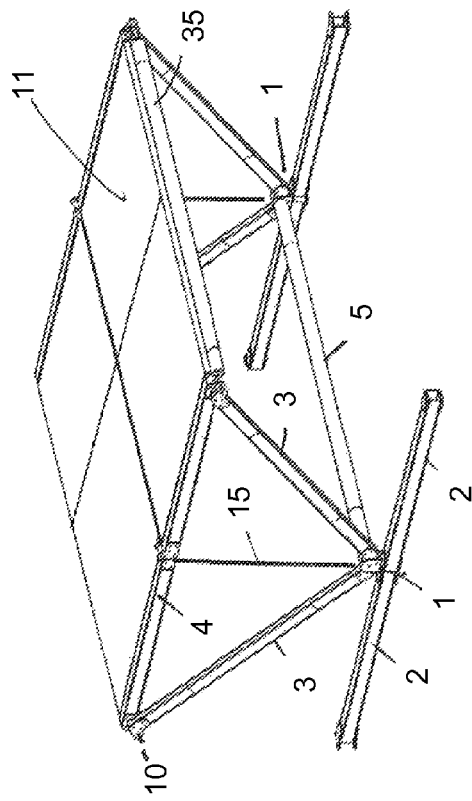
FIG. 3B shows a single rectangular truss bay in a deployed state.
Figure 3C:
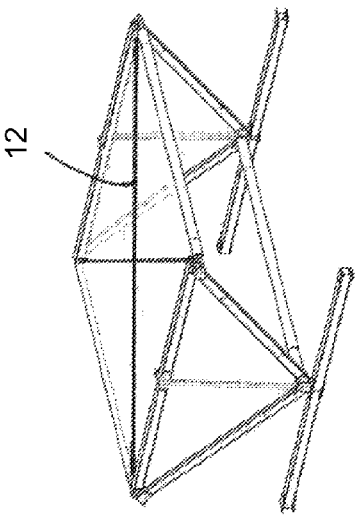
FIG. 3C shows another single rectangular truss bay in a deployed state.
Figure 3A:
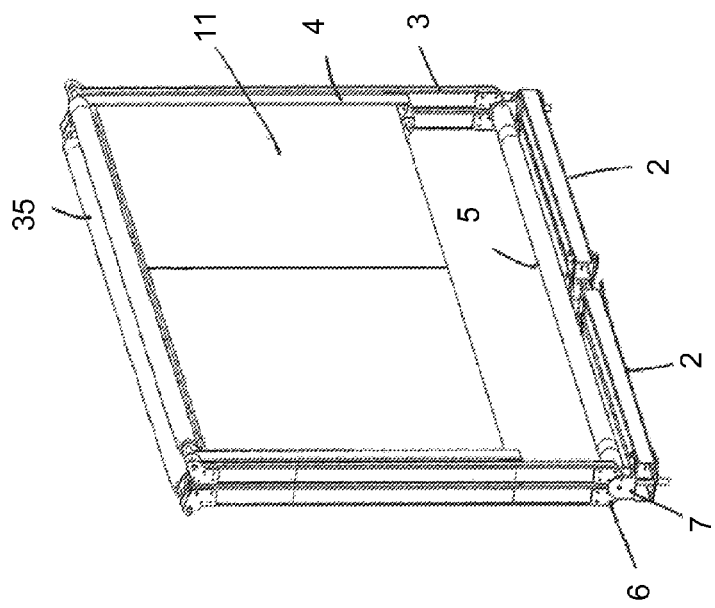
FIG. 3A shows a single rectangular truss bay in a retracted state.

In one exemplary embodiment, as shown in FIGS. 1A and 1B, the present invention comprises a rectangular deployable/folding truss structure. The construction of modified primary 1 and secondary orthogonal joints 30 causes the two adjacent primary chordal members 2 to fold inward in a plane orthogonal to the folding planes of the side diagonals 3 while the two secondary chordal members 4 fold in planes orthogonal to the plane of the in-folding chords 2, thus synchronizing their motion. In FIG. 1, it can be seen that when the truss is fully retracted, the folded diagonals and the folded chords of each bay lie in the same transverse space, and can provide space for two integral panels 11 mounted within the secondary chords 4. This compact nesting of truss members allows the retracted truss to stow in typically 4-8% of its deployed length.

As seen in FIGS. 1A-B, 2A-B and 5, in one embodiment the truss comprises two primary chords, said primary chords comprising a plurality of primary chordal members 2 connected end-to-end by alternating primary orthogonal joints 1 and primary chord center-hinge joints 32. The primary orthogonal joints may have different geometry than the primary chord center-hinge joints. The truss also comprises at least one secondary chord (two for a rectangular or square truss, in cross-section), said secondary chord comprising a plurality of secondary chordal members 4 connected end-to-end by alternating secondary orthogonal joints 30 and secondary chord center hinge-joints 34. The secondary chord hinge joints may have different geometry than the secondary chord center-hinge joints.

The primary orthogonal joints of the prior art comprised two angled fittings to which the truss diagonals and folding chords were attached. The new joint disclosed herein, as shown in FIGS. 3A-C and 4, uses a single two or three-axis fitting (7, 7a, or 8) to connect the hinge joint 6 connecting the diagonals 3 to an offset hinge joint 9 in the folding chords 2. This joint fitting constrains the diagonals 3 to fold in a plane orthogonal to the plane of the primary chords. As long as the pivot axes are oriented as shown, a single two pin fitting 8 can be used, as shown in FIG. 4A, located either outside or inside of the hinge joint which connects the diagonals. Alternatively, a clevis fitting 7 which fits around the hinge joint connecting the diagonal ends can be used. An alternate 3-axis fitting embodiment 7a is shown in FIG. 4C, which has the same kinematic behavior but provides for the adjacent primary chords to be connected directly to the primary joint 1 without use of an offset hinge joint as in the alternative embodiment using fittings 7. In one embodiment, the primary chordal members are connected directly of the joint on opposite sides of the clevis axis.

The joints connecting the diagonals at their respective ends in a z-fold manner, have an offset hinge pin to allow the diagonal members to fold parallel to each other as the truss retracts. The primary chords (and the secondary chords) have the same hinging, but the primary chords connect to the diagonals with the fitting 7, 7a, or 8 as described above, while the secondary chords connect with a single axis hinge pin 10 in the secondary orthogonal joint 30. This allows the secondary chords to fold orthogonally to the primary chords creating the stability and stiffness of the extending or retracting truss. The primary chords, which are center-hinged in the preferred embodiment, can optionally be replaced by flexible tension members.

Referring to FIGS. 1A-B and 3A-C, it should be noted that the primary orthogonal joints 1 may be connected by transverse members 5 which connect the truss sides and determine the truss width (not shown in FIG. 4). Similar transverse members, braces, or chords (flexible or rigid) 35 may extend between the secondary orthogonal joints 30. Cross-bracing 12 may also be used between the secondary chords, as seen in FIG. 3B. This unique joint configuration permits the truss to deploy one bay at a time (as shown in FIG. 2), and with lateral bending stability. The truss bays thus can extend and retract in a sequential manner without need for a complex deployment system or mechanism. The truss can deploy, in z-fold manner, either flat panels 11 nested between the secondary folding chords 4, or transverse members 35, or cross bracing 12 without panels. Panels may comprise any type of panels known in the art, including, but not limited to, solar panels, heat radiation panels, floor panels, wall panels, LCD panels, display panels, or radar panels.

Figure 7:
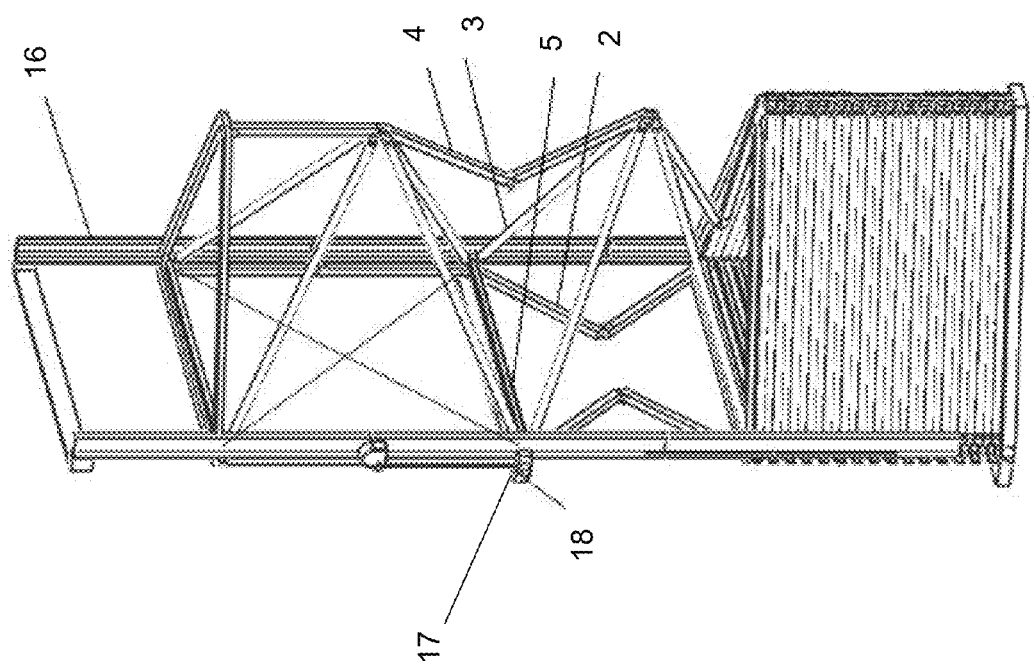
FIG. 7 shows a powered triangular truss in a partially-deployed state.

Although the truss can be readily deployed on a flat surface or in low gravity, in one exemplary embodiment an important method for powered truss deployment and retraction is the use of a support frame 16 with side rails into which rollers 18 fit to support and guide the deployment motion, as seen in FIG. 7. The rollers 18 can be mounted on the primary joints 1, in line with the transverse members 5. The rail structure or support frame may be folding. The rails are preferably long enough to accommodate the first two truss bays and can fold/stow and around the retracted truss bays. The support frame can be vertical, horizontal, or angled, and can be used with the rectangular, square, triangular, or other forms of the truss.

In one embodiment of the rail-supported powered truss, a transverse bar 17 moves longitudinally up and down the rail structures, and can grasp or engage each of the primary orthogonal joints. The bar successively engages the joints and moves them until truss chords lock (or, conversely, unlock), thus forming or collapsing each truss bay in succession. The transverse bar and truss structure may be powered by a motor or other suitable means known in the art.

With or without integral panels, the folded members and joints can form a rectangular or a square truss beam. With an alternate embodiment of the truss diagonals, it can be configured as a triangular beam using the same in-folding center-hinged chords and joints, but with a single chord of center-hinged secondary chordal members 4 at the apex of the resulting hinged triangular frames. In this triangular configuration pairs of opposite truss diagonals 14 are connected to the secondary (apex) chordal members 4, as seen in FIGS. 5A-B. The diagonals have angled hinge fittings at each of their ends, as shown in FIG. 5C, and fold as shown. The kinematic behavior is the same as for the rectangular embodiment.

Figure 6:
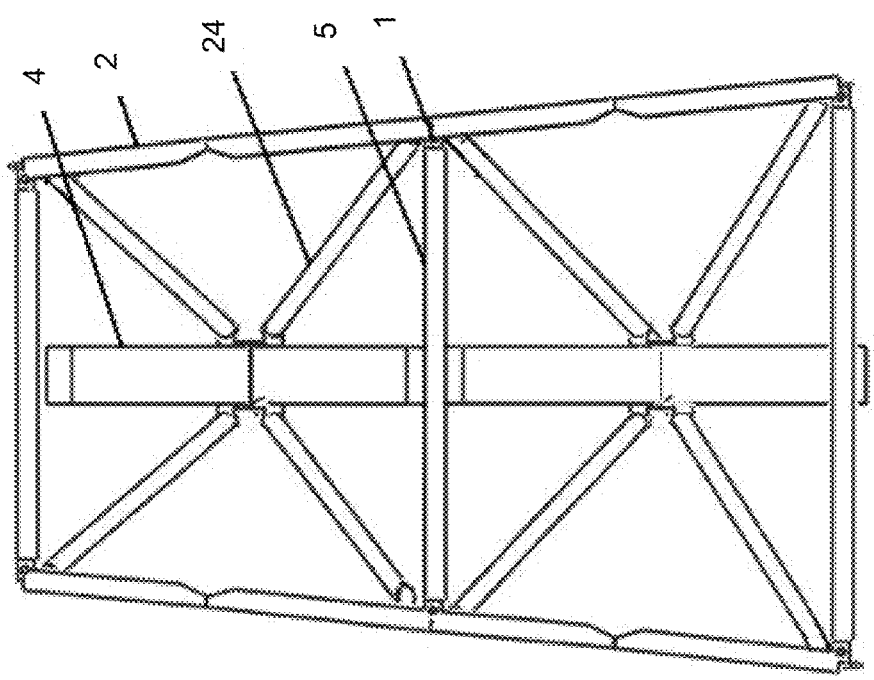
FIG. 6 shows a tapered deployable triangular truss.

As shown in FIG. 6, the transverse members 5 may be successively lengthened or shorted along the truss, so that the truss has a tapered configuration. The diagonals 24 and angled end fittings are configured such that retracted assemblies deploy to form a tapered truss structure. The truss can be tapered in one or two directions (e.g., longitudinal and lateral tapering). The orthogonal joints may have the same geometry as in the non-tapered configuration, and the primary and secondary chords may comprise the same general geometry. In one embodiment, to achieve proper folding of the primary and secondary chords, the center hinge joints are off-center.

In all cases the trusses have at least one-axis symmetry. They can be retracted as shown in FIG. 1A-B until ready for deployment. In this manner, the truss, with or without various types of panels 11, can be folded together compactly for transportation and handling. Truss actuation can be manual or powered using a variety of methods: electrical, fluid, stored energy or other means.

The primary and secondary truss joints, as well as the chordal center hinges can also be adapted to use flexible material hinges replacing certain or all of the pin/hole revolute joint hinges, with potential for spring-powered deployment using energy stored in the hinge material. The flexible material may comprise shape-memory alloy (SMA) or spring material.

With further reference to FIG. 1A-B, the center hinge joints of the primary chords and secondary chords may be fitted with suitable locking devices to lock the truss in its fully deployed state. They can be of various types and can be manual or remotely operated. In one embodiment, the secondary chords, to which flat panels 11 can be attached, comprise a support strut 15 which deploys in synchronization with the folding of the truss members. For optional powered truss operation, the chordal center joints can be fitted with suitable rotary actuators.

Figure 8:
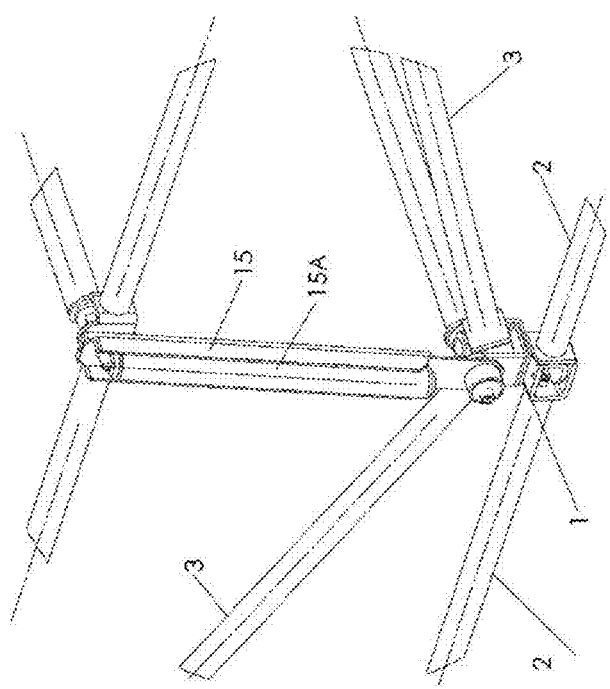
FIG. 8 shows a latching support strut with power actuator.

FIG. 8 shows an embodiment with a latching support strut 15 and a power actuator 15A. The power actuator is optional. The support strut 15 deploys from the folded state with spring-force mating to the center hinge joints of the secondary chords. The joint's hinge pin slides in a groove on the backside of the strut until it is captured in a hole at the top of the strut, thereby latching the strut to the secondary joint and providing structural support. The strut is retained in position by spring force. This eliminates the need for latching of the secondary chord center hinge joints. This motion may be caused by the lifting of the joints, but also can be assisted or effected by a linear power actuator 15A, which in effect drives the hinge pin to the latch hole where it is captured.

Figure 9:
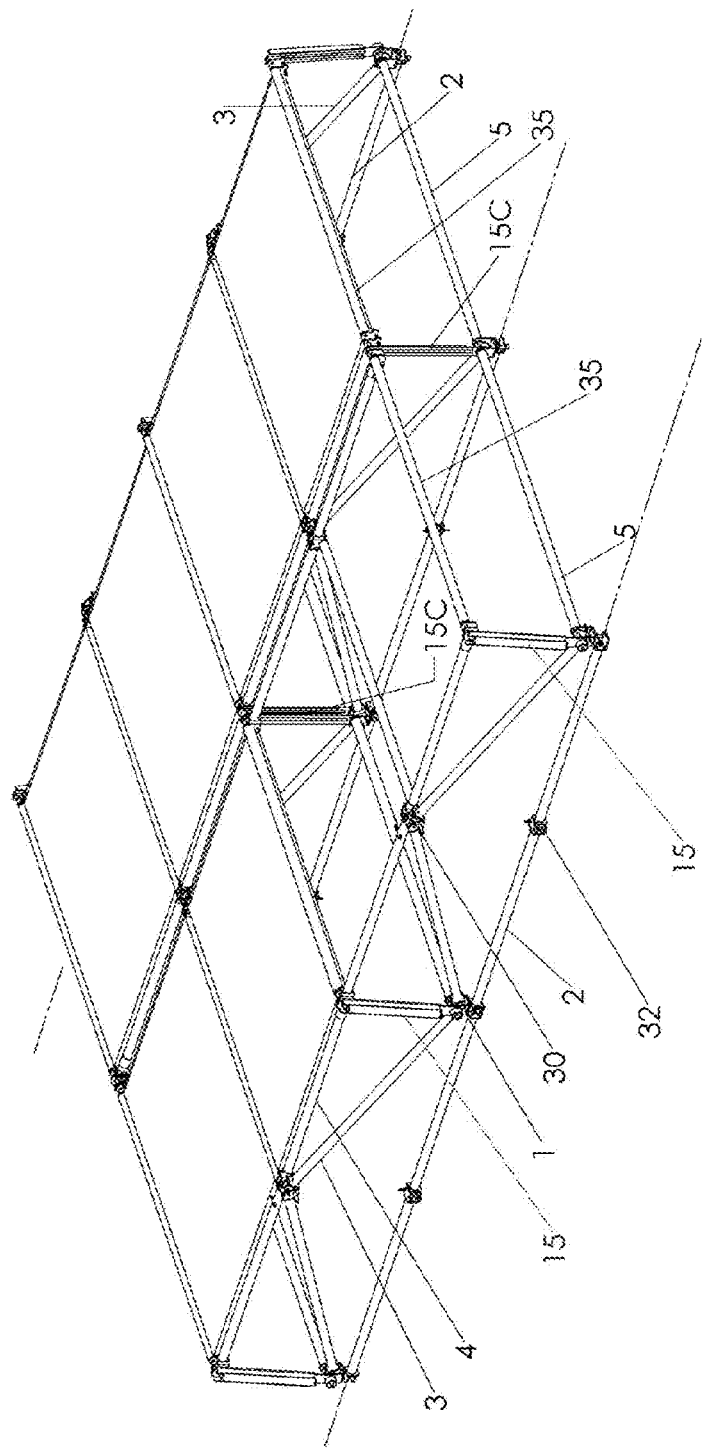
FIG. 9 shows a double-row rectangular truss with bays fully extended.

The basic truss of the present invention can also be configured in a system as a plurality of truss bays merged laterally. FIG. 9 shows an alternative embodiment with two trusses merged laterally to form a double-row folding truss. Interior diagonals are not duplicated, but instead are shared by adjacent truss rows. This permits deployment of twice the number of panels while using fewer chords and diagonals overall, but still deploying and retracting in the same fashion as described above for a single truss. In several embodiments, the interior (or center) support strut 15C is modified to support the center hinge joints of the center secondary chords. The interior center strut 15C deploys and latches passively or actively in the same manner as the support strut 15 described above.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A deployable truss, comprising:
   at least two primary chords, said primary chords comprising a plurality of primary chordal members connected end-to-end by alternating primary orthogonal joints and primary chord center-hinge joints, wherein said primary orthogonal joints have different geometry than the primary chord center-hinge joints;
   at least one secondary chord, said secondary chord comprising a plurality of secondary chordal members connected end-to-end by alternating secondary orthogonal joints and secondary chord center hinge-joints, wherein said secondary chord hinge joints have different geometry than the secondary chord center-hinge joints; and
   a plurality of fixed-length diagonal members, each with a first end and a second end, the first end jointedly connected to a primary orthogonal joint, and the second end jointedly connected to a secondary orthogonal joint, wherein the primary orthogonal joints are not vertically or laterally aligned with the secondary orthogonal joints;
   a plurality of support struts extending between the primary orthogonal joints and the secondary chord center hinge-joints;
   wherein one or more of said support struts latch to the secondary chord center hinge joints when the truss is fully expanded; and
   wherein the primary chordal members fold inward in a plane at an angle to the folding planes of the secondary chords when the truss is retracted.

2. The truss of claim 1, wherein the primary chordal members folding angle is orthogonal.

3. The truss of claim 1, wherein the diagonals are connected to the primary orthogonal joints and secondary orthogonal joints with end fittings having offset hinge axes allowing the diagonals to nest parallel to each other when folded.

4. The truss of claim 1, comprising two secondary chords, so that the truss has a rectangular or square cross-section when the truss is fully expanded.

5. The truss of claim 4, further comprising a plurality of panels extending between the secondary chords.

6. The truss of claim 5, wherein the panels are solar panels, heat radiation panels, floor panels, wall panels, LCD panels, display panels, or radar panels, or combinations thereof.

7. The truss of claim 1, wherein each primary orthogonal joint comprises a single two- or three-axis fitting connected to the first end of a diagonal member.

8. The truss of claim 7, wherein the fitting comprises a clevis fitting.

9. The truss of claim 1, comprising one secondary chord, so that the truss has a triangular cross-section when the truss is fully expanded.

10. The truss of claim 9, wherein the primary chordal members fold inward in a plane at an angle to the folding planes of the diagonals when the truss is retracted.

11. The truss of claim 9, wherein the diagonals are connected to the respective primary orthogonal joints and secondary orthogonal joints with angled end fittings that permit the diagonals to fold at a selected angle.

12. The truss of claim 11, wherein the angled fittings comprise offset hinge axes that permit the diagonals to nest parallel to each other when the truss is retracted.

13. The truss of claim 1, wherein each primary orthogonal joint comprises a 3-axis fitting whereby adjacent primary chordal members are connected directly to the primary orthogonal joint.

14. The truss of claim 1, further comprising power actuators connected to one or more of said support struts.

15. A deployable truss, comprising:
   three primary chords, said primary chords comprising a plurality of primary chordal members connected end-to-end by alternating primary orthogonal joints and primary chord center-hinge joints, wherein said primary orthogonal joints have different geometry than the primary chord center-hinge joints;
   four secondary chords, said secondary chords comprising a plurality of secondary chordal members connected end-to-end by alternating secondary orthogonal joints and secondary chord center hinge-joints, wherein said secondary chord hinge joints have different geometry than the secondary chord center-hinge joints; and a plurality of fixed-length diagonal members, each with a first end and a second end, the first end jointedly connected to a primary orthogonal joint, and the second end jointedly connected to a secondary orthogonal joint, wherein the primary orthogonal joints are not vertically or laterally aligned with the secondary orthogonal joints;

wherein said three primary chords and four secondary chords are arranged in a double row configuration, wherein the four secondary chords comprise two outside secondary chords and two center secondary chords, and the three primary chords comprise two outside primary chords and a center primary chord.

16. A deployable truss, comprising:

three primary chords, said primary chords comprising a plurality of primary chordal members connected end-to-end by alternating primary orthogonal joints and primary chord center-hinge joints, wherein said primary orthogonal joints have different geometry than the primary chord center-hinge joints;

four secondary chords, said secondary chords comprising a plurality of secondary chordal members connected end-to-end by alternating secondary orthogonal joints and secondary chord center hinge-joints, wherein said secondary chord hinge joints have different geometry than the secondary chord center-hinge joints; and a plurality of fixed-length diagonal members, each with a first end and a second end, the first end jointedly connected to a primary orthogonal joint, and the second end jointedly connected to a secondary orthogonal joint, wherein the primary orthogonal joints are not vertically or laterally aligned with the secondary orthogonal joints;

wherein said three primary chords and four secondary chords are arranged in a double row configuration;

further comprising a plurality of support struts extending between the primary orthogonal joints and the secondary chord center hinge-joints on the outside chords, and a plurality of center support struts extending between the primary orthogonal joints and the secondary chord center hinge-joints on the center chords.

17. The truss of claim 16, further comprising power actuators connected to one or more of said support struts and center support struts.

18. The truss of claim 16, wherein one or more of said support struts and center support struts latch to the corresponding secondary chord center hinge joints when the truss is fully expanded.

* * * * *